Figure 1:
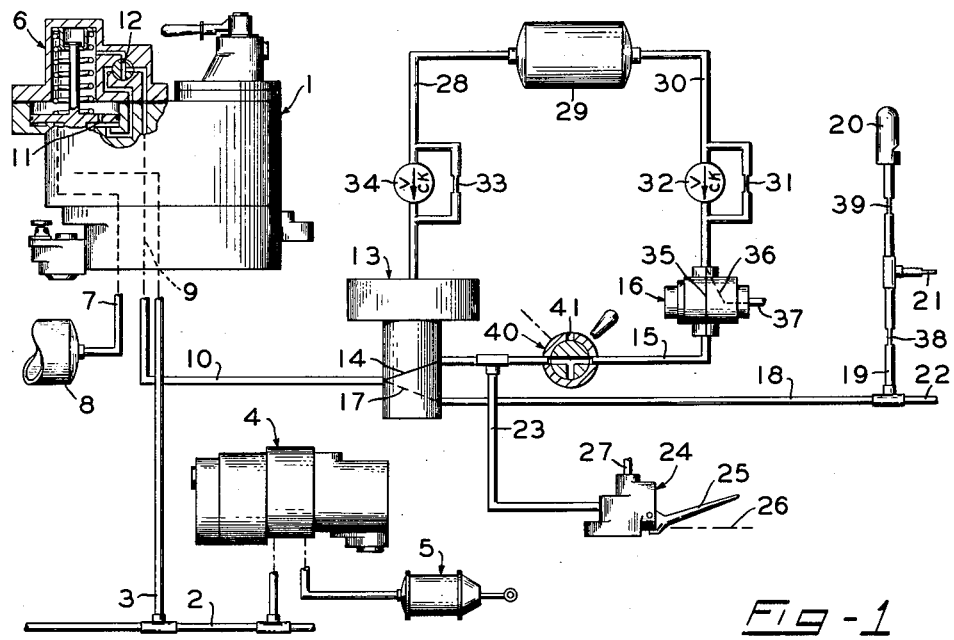

June 9, 1964 J. R. EDMUND 3,136,585
FLUID PRESSURE BRAKE APPARATUS WITH PERIODIC
ACKNOWLEDGEMENT TYPE SAFETY CONTROL
Original Filed June 27, 1961

INVENTOR.
JOHN R. EDMUND
BY
O.C. Steinmeller
ATTORNEY

United States Patent Office 3,136,585
Patented June 9, 1964

3,136,585
FLUID PRESSURE BRAKE APPARATUS WITH PERIODIC ACKNOWLEDGMENT TYPE SAFETY CONTROL
John R. Edmund, Berkeley, Calif., assignor to Westinghouse Air Brake Company, Wilmerding, Pa., a corporation of Pennsylvania
Continuation of application Ser. No. 119,927, June 27, 1961. This application Oct. 29, 1962, Ser. No. 234,282
10 Claims. (Cl. 303—19)

This invention relates to fluid pressure brake apparatus with periodic acknowledgment type safety control system, that is, a safety control system requiring certain periodic acknowledging operations by the operator to prevent a penalty control operation which will otherwise be effected automatically by the safety control system should the operator fail to perform the acknowledging operations, this application being a continuation of Serial No. 119,927, filed June 27, 1961.

Safety control systems are commonly used on vehicles such as railway locomotives, which are customarily equipped with the well-known "dead-man" or safety control valve device having a foot pedal which the operator or engineer is required to keep depressed at all times by resting his foot thereon except at such times when he is effecting a brake application manually, the purpose of said "dead-man" valve device, as the name implies, being to effect a brake application automatically if, for any reason such as the engineer's blacking out, the foot pedal is released. Of course, the purpose of the "dead-man" valve device can be readily defeated by placing a weight or other object on the foot pedal instead of the engineer's foot. To overcome such undesirable practice, safety control apparatus requiring periodic acknowledging operations by the engineer have been proposed, the interval in some instances being a fixed period of time, in others a fixed distance traveled by the locomotive, which in others the time interval is related to the rate of speed of the locomotive so that the high the rate of speed the shorter will be the time interval.

The principal object of this invention is to provide an improved safety control system requiring periodic acknowledgment by the engineer at the expiration of each of successively continuing time intervals, said safety control system being characterized by simplicity of structure and, therefore, trouble-free operation for maximum effectiveness as well as low cost of production. The improved safety control circuit or system embodying the invention is interposed in a safety control pipe of the locomotive brake control equipment leading from a control chamber of a service application portion of the engineer's automatic brake valve device to other safety control equipment such as the "dead man" valve device provided as a component of presently existing brake control equipment. Briefly, the invention comprises a safety control circuit or system interposed in the safety control pipe between the engineer's automatic brake valve device and the other safety control devices, said safety control circuit comprising a two-position valve device including a valve member having a normal position in which communication through the safety control pipe is open to the "dead man" valve device (which normally is held in a closed position by the engineer to prevent reduction in the safety control pipe) and operable by a spring-biased piston, responsively to fluid pressure in excess of a preselected value in a control chamber, to a vent position in which said safety control pipe is vented, at a restricted rate, to atmosphere through an audible warning device. A timing arrangement including a timing volume is provided in the safety control circuit whereby, after a predetermined time interval, the control chamber is sufficiently charged to effect operation of the valve member by the piston from its normal position to its vent position, whereupon the warning device apprises the engineer to acknowledge by releasing the "dead man" valve, which causes actuation of a quick release valve device in the safety control circuit. The quick release valve device assures venting of the timing volume without delay, while a choke between the control chamber and the timing volume delays venting of said control chamber sufficiently to permit the timing volume to be as nearly completely exhausted of fluid pressure as is desirable. Venting of the control chamber renders the spring-biased piston effective to restore the valve member to its normal position, whereupon further venting of the safety control pipe by way of the audible warning device and, therefore, the warning signal itself are terminated. Upon termination of the warning signal, the engineer recloses the "dead man" valve. Unless, therefore, the engineer acknowledges both when the signal sound begins and when it stops, pressure in the safety control pipe will be reduced to such a degree as to cause a penalty brake application. The time interval between cycles of operation of the safety control circuit is determined by the size of the timing volume and the various chokes employed in the system.

Figure 2:
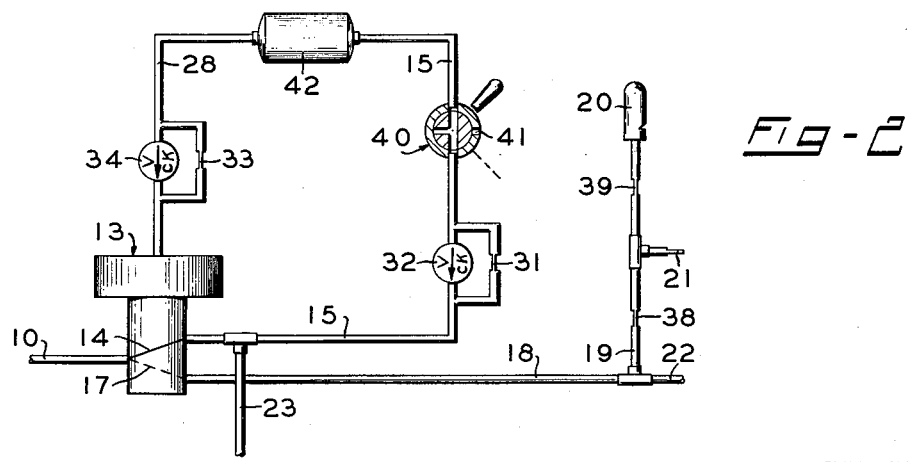

In the drawing, FIG. 1 shows a schematic arrangement of the safety control circuit embodying the invention and as applied to existing brake control equipment; FIG. 2 shows a modification, a schematic form, of the safety control system, shown in FIG. 1.

*Description and Operation—FIG. 1*

For purposes of illustrating an application of the safety control apparatus embodying the invention, said apparatus is shown in the drawing, particularly in FIG. 1 as being operatively connected to brake control equipment of the fluid pressure operable type of a railway locomotive. The locomotive brake control equipment may be of any suitable type such as that fully described and illustrated in Instruction Pamphlet No. 5066, dated March, 1957, and published by Westinghouse Air Brake Company, said brake control equipment being designated "24–RL Locomotive Brake Equipment." Since a detailed description of the brake control equipment is not deemed essential to an understanding of the invention, and since reference may be had to the above-mentioned publication, the brake control equipment, as shown in the drawing, will be only very briefly described. Such equipment comprises an engineer's automatic brake valve device 1 designated in the above-mentioned pamphlet as the "DS-24 Brake Valve" and manually operable by the engineer for controlling fluid pressure in a brake pipe 2 connected via a branch pipe or conduit 3 to said engineer's brake valve device. As is well known by those skilled in the art, operation of the engineer's brake valve device 1 for effecting a reduction of fluid pressure in the brake pipe 2 causes a brake control valve device 4, designated in the above-mentioned pamphlet as the "D-24 Control Valve," to effect supply of fluid under pressure (from a source not shown) to a brake cylinder device 5, whereby a brake application corresponding to the degree of reduction in brake pipe pressure is applied to the locomotive wheels (not shown). Operation of the automatic brake valve device 1 for effecting restoration of fluid pressure in the brake pipe 2 to a preselected normal value causes the brake control valve device 4 to effect venting of brake-applying pressure from the brake cylinder device 5 and thereby release the brake application.

One of the components of the automatic brake valve device 1 is a service application portion 6 comprising valve means (not shown) operated by a piston subjected on one side to fluid pressure in a pressure chamber adjacent thereto, said chamber being supplied with fluid under pressure via a conduit 7 from a source, such as a reservoir 8, while the opposite side of said piston is subjected to the force of a biasing spring and fluid pressure in a control chamber adjacent thereto, said control chamber having one end of a safety control passage 9 opening thereinto, while the other end of said control passage connects to a conduit 10. Both the passage 9 and the conduit 10 are charged from the pressure chamber of the service application portion, at a restricted rate, via a choked passage 11 extending through the piston to connect said pressure chamber to the control chamber. When fluid pressure in the control passage 9, and therefore in the control chamber, is reduced below a preselected value, the piston-operated valve means is actuated by the opposing pressure in the pressure chamber to a brake application position, whereby the automatic brake valve device 1 is actuated to cause a reduction of fluid pressure in brake pipe 2 for effecting a brake application, as above described. When fluid pressure in the control passage 9 is restored to a preselected normal value, the piston-operated valve means is returned to a normal position in which the brake valve device 1 effects restoration of normal fluid pressure in the brake pipe 2, and the control valve device 4 effects a release of the brake application.

It should be understood that each of the cars making up a train is provided with a brake control valve device similar to the brake control valve device 4 and that the brake pipe 2 extends the entire length of the train so that the brakes on the entire train are controlled from the engineer's automatic brake valve device 1.

In locomotive brake equipment of the type above described, the safety control passage 9 is normally connected via conduit 10 to a safety control device or devices such as the "dead man" or safety valve device, above described, and an audible or visible warning device for indicating that the safety control devices have been actuated in response to an emergency situation.

A cut-out cock 12, manually operable from the exterior of the automatic brake valve device 1, is interposed in safety control passage 9 between the control chamber of the service application portion 6 of said valve device and the conduit 10, whereby, in the event of undesirable pressure reduction in said safety control passage due to malfunctioning of the safety control devices or excessive leakage of fluid pressure in the safety control system, the cut-out cock may be operated to close off communication between said service application portion and the safety control devices to prevent untimely application of the brakes due to said malfunctioning of said safety control devices or excessive leakage therein.

In the present invention, conduit 10 is connected to a two-position valve device 13 including, though not shown, piston-operated valve means spring-biased toward a first position in which a communication 14, indicated diagrammatically in the drawing by a solid line, is established between conduit 10 and a conduit 15 connecting with a supply inlet of a quick release valve device 16. The piston-operated valve means in the two-position valve device 13 is operable responsively to fluid in a control chamber (not shown) at a pressure adequate for overcoming the opposing force of the biasing spring acting on said valve means, to a second position in which communication 14 is cut off and a communication 17, indicated diagrammatically in the drawing by a broken line, is established between conduit 10 and a pressure release communication comprising a conduit 18 connecting, via a branch conduit 19, with an audible warning device, such as a whistle 20, and a choked atmospheric vent 21. Conduit 18 may also be connected to other devices, such as a pressure gauge (not shown) for example, via an extension conduit 22.

Conduit 15 is connected via a branch conduit 23 to a "dead man" or safety valve device 24 having a foot pedal 25 which the engineer normally maintains in a depressed position by keeping his foot thereon, said depressed position being indicated by the broken line 26 in the drawing. The foot pedal 25, which is biased (by means not shown) to a raised position, in which it is shown in the drawing, when foot pressure thereon is released, controls operation of valve means (not shown) in the safety valve device 24 to either a venting position, in which conduit 23 is opened to atmosphere via vent port 27 when said foot pedal is in its raised position, or to a cut-off position in which such venting to atmosphere is cut off when the foot pedal is in its depressed position.

The control chamber of the two-position valve device 13 is connected via a conduit 28 to a timing volume 29 which, in turn, is connected to a fluid pressure delivery outlet of the quick release valve device 16 via a conduit 30. A choke 31 interposed in conduit 30 restricts flow of fluid under pressure from the release valve device 16 to the timing volume 29 to a preselected rate, while a check valve 32, also interposed in said conduit in parallel relation to said choke, permits unrestricted flow in the reverse direction. A choke 33 interposed in conduit 28 restricts flow of fluid under pressure from the control chamber of the two-position valve device 13 toward the timing volume 29, while a check valve 34, also interposed in said conduit in parallel relation to said choke, permits unrestricted flow in the opposite direction.

The purpose of the quick release valve device 16 is to effect rapid venting of fluid pressure from the timing volume 29, for a purpose to be more fully explained hereinafter, said release valve device including fluid pressure operable valve means (not shown) operable responsively to fluid pressure in a control chamber (not shown) to a supply position in which a communication 35, shown diagrammatically by a solid line in the drawing, is established between conduits 15 and 30. Upon reduction of fluid pressure in the control chamber below a preselected valve, which reduction may be effected by release of foot pedal 25 of the safety device 24 to its raised position for venting conduit 23 and said control chamber via vent port 27, the valve means in the quick release valve device 16 is caused to be operated to a release position in which communication 35 is cut off and a communication 36, shown diagrammatically in the drawing as a broken line, is established between conduit 30 and an atmospheric vent 37 in said quick release valve device for effecting rapid dissipation of fluid pressure from timing volume 29 via conduit 30 and the one-way check valve 32. The quick release valve device 16 may be omitted if the size of the timing volume is such that venting thereof may be effectively accomplished via the safety valve device 24, as will later be noted.

In considering the operation of the safety control apparatus embodying the invention, let it be assumed that the train is in motion with the brakes released and that control passage 9 and conduit 10 are charged to normal pressure from reservoir 8 via conduit 7 and choke 11. Let it also be assumed that the engineer is holding the foot pedal 25 of the safety valve device 24 in its depressed position, whereby venting of conduit 23 by way of port 27 is cut off.

With control passage 9 and conduit 10 charged with fluid under pressure, said fluid under pressure flows, via conduit 15 and communication 35 in the release valve device 16, to conduit 30 and thence to timing volume 29 and to the control chamber in the two-position valve device 13 through the check valve 34, the flow through conduit 30 being restricted by choke 31 and thereby delaying build-up of fluid pressure in said timing volume and said control chamber accordingly. After a predetermined time interval as determined by the flow rate of choke 31 and the capacity of timing volume 29, fluid pressure builds up in the control chamber of the two-position valve device 13 sufficiently to operate the piston-operated valve means therein to its second position in which communication 14 is closed and communication 17 is established. Thus, further flow of fluid under pressure from conduit 10 to conduit 15 is cut off and said flow from conduit 10 is diverted, by communication 17, to conduits 18 and 19 from whence it may escape via restricted vent 21 and whistle 20, which emits an audible warning signal. The escape of fluid pressure via vent 21 and whistle 20 is restricted to respective predetermined rates by a choke 38 interposed in conduit 19 ahead of vent 21 and a choke 39 interposed in conduit 19 between said choke 38 and whistle 20. By restricting the rate of fluid pressure escape via vent 21 and whistle 20, rapid reduction of fluid pressure in conduit 10 and therefore in control passage 9 is prevented for a purpose to be immediately disclosed.

Upon hearing the audible warning signal from the whistle 20, the engineer must take certain measures to prevent reduction of fluid pressure in conduit 10 and therefore control passage 9 to a value at which the service portion 6 of the automatic brake valve device 1 would function to automatically effect a penalty brake application on the train. The engineer, therefore, immediately releases foot pressure on the foot pedal 25 of the safety valve device 24, whereby conduit 15 and therefore the control chamber in the release valve device 16 are vented to atmosphere via vent port 27 of said safety valve device. Venting of the control chamber in the release valve device 16 causes the valve means therein to be operated to its release position to cut off communication 35 and establish communication 36, whereupon rapid venting of timing volume 29 is effected by way of conduit 30, check valve 32, communication 36 and vent port 37.

At the same time, the control chamber of the two-position valve device 13 is also vented via conduit 28 and the venting circuit by which timing volume 29 is vented, as above described. The rate of venting of the control chamber in the two-position valve device 13, however, is restricted to the predetermined flow rate of choke 33 only, since the check valve 34 is closed during such venting. Choke 33, therefore, sufficiently delays venting of the control chamber in valve device 13 and operation of the valve means therein to its first position to thereby permit substantially complete exhaustion of fluid pressure in timing volume 29 before said valve means moves to its first position. Complete exhaustion of timing volume 29 is desirable for the reason that, when fluid pressure in the control chamber of the two-position valve device 13 has been reduced sufficiently to permit restoration of the valve means therein to its first position and, therefore, reestablishment of communication 14, the recharging of timing volume 29 and build-up of fluid pressure in said control chamber will require the full time necessary to recharge a completely exhausted volume and, therefore, the desired cycling time interval is maintained.

Upon cutoff of communication 17 and reestablishment of communication 14, further venting of conduit 10 and control passage 9 via vent 21 and whistle 20 is terminated, the reduction in said control passage and conduit accomplished during such venting not being sufficient to render the service application portion 6 of the automatic valve device 1 effective for causing a brake application to be effected. It should be noted, however, that when communication 14 is reestablished, foot pedal 25 of the safety valve device 24 is still in its raised position and conduit 23 is open to atmosphere via vent 27. Unless the engineer takes further measures, therefore, fluid pressure in control passage 9 and conduit 10 will continue to vent via communication 14, conduit 23 and vent port 27 in the safety valve device 24. To prevent such further venting of control passage 9 and a resulting penalty brake application the engineer, upon noting that the audible warning from whistle 20 has ceased and being thereby apprised that the valve means in the valve device 13 has shifted from its second to its first position, immediately depresses foot pedal 25 and cuts off further venting of control passage 9 by way of vent port 27, thus thwarting any penalty brake application.

With further venting of control passage 9 and conduit 10 cut off, the fluid pressure in timing volume 29 and in the control chamber of the two-position valve device 13 again builds up to a value at which the operation above described is again initiated and is terminated by the acknowledging operations of the engineer, as above described, the safety control system thus operating in cycling fashion at uniform intervals of time as determined by the dimensions of timing volume 29 and the various chokes in the system. The engineer's alertness, therefore, is periodically tested and confirmed by his execution of the acknowledging operations required to prevent a penalty brake application.

A cut-out cock 40 is interposed in conduit 15 between the two-position valve device 13 and the quick release valve device 16 for the purpose of cutting out operation of the acknowledging portion of the safety control system comprising the valve device 13, the release valve device 16, timing volume 29 and the associated conduits, chokes and check valves in the event of any malfunctioning thereof or excessive leakage of fluid pressure in said acknowledging portion. The cut-out cock 40 may be of the side-venting type having a cut-in position, in which it is shown in the drawing and in which communication through conduit 15 is open, said cut-out cock being manually operable to a cut-out position, indicated by a broken line in the drawing and in which said communication is interrupted and the side of conduit 15 adjacent release valve device 16 is vented to atmosphere via a vent port 41, thereby effecting venting of the control chamber in said release valve device and consequent venting of the control chamber in the two-position valve device 13. Thus communication 14 is maintained established and safety valve device 24 continues operatively effective in the cut-out position of cut-out cock 40. The cut-out cock 40 is provided with a seal which the engineer must break before operating it to a cut-out position.

*Description and Operation—FIG. 2*

The safety control system shown in FIG. 2 is generally similar to that shown in FIG. 1 and above described with the exception that the quick release valve device 16 is omitted. As was pointed out above in connection with the safety control system shown in FIG. 1, the quick release valve device 16 insures rapid and substantially complete venting of the timing volume 29. Results of tests made with the invention herein described show that if a smaller timing volume is employed in the system, the use of a quick release valve device is not necessary. Of course, the desired length of the cycling interval of time must also be considered in determining the size of the timing volume and the use of a quick release valve device therewith.

The operation of the safety control system shown in FIG. 2 is similar to that of the control system shown in FIG. 1 with the exception that, in this case, a timing volume 42 is employed which, as shown, is a smaller volume than timing volume 29, and the control chamber in the valve device 13 is vented by way of conduit 15, check valve 32, conduit 23 and the vent port 27 of the safety valve device 24, instead of through a quick release valve device, when the engineer releases the foot pedal 25 of the safety valve device 24 in response to the warning signal from whistle 20.

Having now described the invention, what I claim as new and desire to secure by Letters Patent, is:

1. A fluid pressure safety control system comprising a control conduit normally charged with fluid at a predetermined pressure, a preselected reduction of pressure in which is effective to initiate a penalty control operation, a fluid pressure operable valve device comprising a control chamber and valve means operable responsively to variations of fluid pressure in said control chamber, first conduit means via which fluid under pressure may be supplied to and released from said control chamber at a controlled rate, second conduit means constantly in communication with atmosphere and via which fluid under pressure may be released at a restricted rate from said control conduit, said valve means being operative to one position, upon reduction of fluid pressure in said control chamber to below a certain value, to establish a first communication between said control conduit and said first conduit means for charging said control chamber with fluid under pressure, and being operable responsively to build-up of fluid pressure in said control chamber above said certain value, to a different position in which said first communication is cut off and a second communication between the control conduit and said second conduit means is established, and a manually operable safety valve device connected to said first conduit means and selectively operable to a venting position in which said first conduit means is opened to atmosphere for venting said control chamber and thereby effecting restoration of said valve means from its said different position to its said one position, whereby reduction of fluid pressure in the control conduit via said second conduit means may be terminated before attaining said preselected reduction at which the penalty control operation would occur, and being operable to a cut-off position in which said first conduit means is cut off from atmosphere for terminating reduction of fluid preslsure in the control conduit, via said safety valve device, before reaching said preselected reduction, and thereby preventing occurrence of the penalty control operation and permitting build-up of fluid pressure in said control chamber.

2. A fluid pressure safety control system as defined in claim 1, further characterized by a timing volume of preselected volume interposed in said first conduit means whereby to determine the interval of time required to effect operation of the valve means of said valve device from its said one position to its said different position.

3. A fluid pressure safety control system, as defined in claim 1, further characterized by a warning signal device associated with said second conduit means, said signal device being actuable, upon establishment of said second communication, for emitting a warning signal, upon which the operator is apprised for operating the safety valve device to its venting positiong, said warning signal being terminated upon cutoff of said second communication by restoration of said valve means to its said one position thereby apprising the operator to operate said safety valve device to its said cut-off position.

4. A fluid pressure safety control system, as defined in claim 2, further characterized by choke and check valve means interposed in parallel relation in said first conduit means between said control chamber and said timing volume and being operative for permitting unrestricted flow of fluid under pressure to said control chamber during build-up of fluid pressure therein and for restricting flow of fluid under pressure from said control chamber and thereby causing a predetermined delay during venting of said control chamber, whereby said timing volume may be substantially completely exhausted of fluid pressure, upon operation of said safety valve device to its said venting position, before said valve means returns to its said one position.

5. A fluid pressure safety control system comprising a control conduit normally charged with fluid at a predetermined pressure, a preselected reduction of pressure in which is effective to initiate a penalty control operation, a fluid pressure operable valve device comprising a control chamber and valve means operable responsively to variations of fluid pressure in said control chamber, first conduit means via which fluid under pressure may be supplied to and released from said control chamber at a controlled rate, second conduit means constantly in communication with atmosphere and via which fluid under pressure may be released at a restricted rate from said control conduit, said valve means being operative to one position, upon reduction of fluid pressure in said control chamber to a value below a certain value, to establish a first communication between said control conduit and said first conduit means for charging said control chamber with fluid under pressure, and being operable responsively to build-up of fluid pressure in said control chamber above said certain value, to a different position in which said first communication is cut off and a second communication between the control conduit and said second conduit means is established, a timing volume interposed in said first conduit means for delaying build-up of fluid pressure in said control chamber in accordance with the volume of said timing volume, a quick release valve device interposed in said first conduit means between said fluid pressure operable valve device and said timing volume and having a pressure chamber subject to fluid pressure in said first conduit means, said quick release valve device being operable responsively to fluid pressure in said pressure chamber to a supply position in which flow of pressurized fluid, through said first conduit means from the control conduit to said timing volume and control chamber, is uninterrupted, and being operative, upon relief of fluid pressure from said pressure chamber, to a release position in which said flow through said first conduit means is interrupted and a third communication for venting said timing volume and control chamber to atmosphere is established, a safety valve device connected to said pressure chamber via said first conduit means and selectively operable to a venting position for venting said pressure chamber to atmosphere via said first conduit means and thereby effecting operation of said quick release valve device to its release position, whereby consequent restoration of said valve means to its said one position is effected before reduction of pressure in the control conduit reaches said preselected reduction at which the penalty control operation would occur, said safety valve device being operative to a cut-off position whereby further venting of said first conduit means and said control conduit, via said safety valve device, may be terminated and fluid pressure supply to said pressure chamber restored before fluid pressure in the control conduit is reduced below said preselected reduction at which the penalty control operation would occur, and choke and check valve means interposed in parallel relation in said first conduit means between said control chamber and said timing volume and being effective for permitting unrestricted flow of fluid under pressure to said control chamber during build-up of fluid pressure therein and for restricting flow of fluid under pressure from said control chamber and thereby causing a predetermined delay during venting of said control chamber, whereby said timing volume may be substantially completely exhausted of fluid pressure, upon operation of said quick release valve device to its release position, before said valve means returns to its said one position.

6. A fluid pressure safety control system, as defined in claim 5, further characterized by a cut-out cock interposed in said first conduit means and effective in one position in which communication may be established between the control chamber of said fluid pressure operable valve device and the control conduit and operative to a cut-out position in which it vents the control chamber of said quick release valve device to cause venting of the timing volume and the control chamber of the fluid pressure operable valve device to restore said valve means to its said one position in which the safety valve device remains effectively operable notwithstanding.

7. A fluid pressure safety control system comprising a control conduit normally charged with fluid at a predetermined pressure, a preselected reduction of pressure in which is effective to initiate a penalty control operation, a fluid pressure operable valve device comprising a control chamber and valve means operable responsively to variations of fluid pressure in said control chamber, first conduit means via which fluid under pressure may be supplied to and released from said control chamber, second conduit means constantly in communication with atmosphere and via which fluid under pressure may be released at a restricted rate from said control conduit, said valve means being operative to one position, upon reduction of fluid pressure in said control chamber to a value below a certain value, to establish a first communication between the control conduit and said first conduit means for charging said control chamber with fluid under pressure, and being operable responsively to build-up of fluid pressure in said control chamber above said certain value, to a different position in which said first communication is cut off and a second communication is established between the control conduit and said second conduit means for releasing fluid pressure from said control chamber, a timing volume interposed in said first conduit means for delaying build-up of fluid pressure in said control chamber in accordance with the volume of said timing volume, a safety valve device connected to said first conduit means and selectively operable to a venting position in which said first conduit means is opened to atmosphere for venting said timing volume and said control chamber and thereby causing restoration of said valve means to its said one position, whereby reduction of fluid pressure in the control conduit via said second conduit means may be terminated before attaining said preselected reduction at which the penalty control operation would occur, and being operable to a cut-off position in which said first conduit means is cut off from atmosphere for terminating reduction of fluid pressure in the control conduit, via said safety valve device, before reaching said preselected reduction and thereby preventing occurrence of the penalty control operation and permitting build-up of fluid pressure in said control chamber, first choke and check valve means interposed in parallel relation in said first conduit means between said control chamber and said timing volume and being operative for permitting unrestricted flow of fluid under pressure from said timing volume to said control chamber during build-up of fluid pressure therein and for restricting flow of fluid under pressure from said control chamber and thereby causing a predetermined delay during venting of said control chamber, whereby said timing volume may be substantially completely exhausted of fluid pressure, upon operation of said safety valve device to its said venting position, before said valve means returns to its said one position, and second choke and check valve means interposed in parallel relation in said first conduit means between said fluid pressure operable valve device and said timing volume, said second choke and check valve means being operative for restricting flow of fluid under pressure, via said first conduit means, to a predetermined rate from the control conduit to the timing volume and the control chamber to prevent sudden reduction of fluid pressure in the control conduit to said preselected reduction and for permitting unrestricted flow of fluid pressure from the timing volume to atmosphere upon operation of said safety valve device to its venting position.

8. A fluid pressure safety control system as defined in claim 7, further characterized by a warning signal device associated with said second conduit means, said signal device being actuable, upon establishment of said second communication, for emitting a warning signal, upon which the operator is apprised for operating the safety valve device to its venting position, said warning signal being terminated upon cutoff of said second communication by restoration of said valve means to its said one position thereby apprising the operator to operate said safety valve device to its said cut-off position.

9. A fluid pressure safety system, as defined in claim 7, further characterized by a cut-out cock interposed in said first conduit means and effective in one position in which communication may be established between the control chamber of said fluid pressure operable valve device and the control conduit and operative to a cut-out position in which it vents said timing volume and said control chamber to restore said valve means to its said one position in which said safety valve device remains effectively operable notwithstanding.

10. A fluid pressure safety control system comprising a control conduit normally charged with fluid at a predetermined pressure, a preselected reduction of pressure in which is effective to initiate a penalty control operation, a release conduit via which fluid under pressure may be released from said control conduit at a restricted rate, fluid pressure operable valve means interposed between said control conduit and said release conduit, said fluid pressure operable valve means being operable responsively to fluid pressure alternately supplied thereto and released therefrom at a controlled rate for alternately opening and cutting off communication between said control conduit and said release conduit, a supply conduit via which pressurized fluid may be supplied to and released from said fluid pressure operable valve means, manually operable valve means connected to said supply conduit and being alternately operable to an open position and a closed position for causing fluid under pressure to be alternately supplied and released through said supply conduit, and a signal device operatively connected to said release conduit whereby said signal device is responsive to fluid pressure released via the release conduit from the control conduit for providing a signal.

No references cited.